United States Patent
Wang et al.

(10) Patent No.: US 10,911,409 B2
(45) Date of Patent: *Feb. 2, 2021

(54) ENGAGEMENT AND DISENGAGEMENT OF TRANSPORT LAYER SECURITY PROXY SERVICES WITH ENCRYPTED HANDSHAKING

(71) Applicant: Cisco Technology, Inc., San Jose, CA (US)

(72) Inventors: Jianxin Wang, Saratoga, CA (US); Prashanth Patil, San Jose, CA (US); Flemming Andreasen, Marlboro, NJ (US); Nancy Cam-Winget, Mountain View, CA (US); Hari Shankar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/984,637

(22) Filed: May 21, 2018

(65) Prior Publication Data

US 2019/0356694 A1 Nov. 21, 2019

(51) Int. Cl.
*H04L 29/06* (2006.01)

(52) U.S. Cl.
CPC ........ *H04L 63/0281* (2013.01); *H04L 63/061* (2013.01); *H04L 63/0823* (2013.01); *H04L 63/166* (2013.01)

(58) Field of Classification Search
CPC . H04L 63/02; H04L 63/0281; H04L 63/0236; H04L 63/16; H04L 63/166;
(Continued)

(56) References Cited

U.S. PATENT DOCUMENTS 7,076,650 B1 * 7/2006 Sonnenberg ........ H04L 63/0227
713/151
7,769,820 B1   8/2010 Spies et al.
(Continued)

OTHER PUBLICATIONS

E. Rescorla, "The Transport Layer Security (TLS) Protocol Version 1.3", draft-ietf-tls-tls13-21, Network Working Group, RTFM, Inc., Jul. 3, 2017, 143 pgs.
(Continued)

*Primary Examiner* — Kristine L Kincaid
*Assistant Examiner* — Shaqueal D Wade
(74) *Attorney, Agent, or Firm* — Edell, Shapiro & Finnan, LLC

(57) ABSTRACT

Techniques are presented herein for engagement and disengagement of Transport Layer Security proxy services with encrypted handshaking. In one embodiment, a first initial message of a first encrypted handshaking procedure for a first secure communication session between a first device and a second device is intercepted at a proxy device. The first initial message includes first key exchange information for encrypting the first encrypted handshaking procedure. A copy of the first initial message is stored at the proxy device. A second initial message of a second encrypted handshaking procedure for a second secure communication session between the proxy device and the second device is sent from the proxy device to the second device. The second initial message includes second key exchange information for encrypting the second encrypted handshaking procedure. The proxy device determines, based on the second encrypted handshaking procedure, whether to remain engaged or to disengage.

20 Claims, 10 Drawing Sheets

(58) Field of Classification Search
CPC ... H04L 63/061; H04L 63/30; H04L 63/0823; H04L 63/0884; H04L 67/28; H04W 88/182
See application file for complete search history.

(56) References Cited

U.S. PATENT DOCUMENTS

| | | | |
|---|---|---|---|
| 8,190,879 | B2 | 5/2012 | Wang |
| 8,214,635 | B2 | 7/2012 | Wang et al. |
| 8,504,822 | B2 | 8/2013 | Wang et al. |
| 8,533,457 | B2 * | 9/2013 | VanHeyningen ... H04L 63/0428 713/153 |
| 8,683,052 | B1 | 3/2014 | Brinkskelle |
| 9,124,628 | B2 * | 9/2015 | Shankar ................ H04L 63/166 |
| 9,237,168 | B2 | 1/2016 | Wang et al. |
| 2002/0035685 | A1 | 3/2002 | Ono et al. |
| 2003/0084279 | A1 | 5/2003 | Campagna |
| 2010/0318784 | A1 | 12/2010 | Rao et al. |
| 2013/0312054 | A1 | 11/2013 | Wang et al. |
| 2014/0082204 | A1 | 3/2014 | Shankar et al. |
| 2016/0127414 | A1 * | 5/2016 | Mazur ................ H04L 63/1408 713/151 |
| 2016/0373263 | A1 * | 12/2016 | Zaidi ..................... H04L 9/3265 |
| 2016/0380984 | A1 | 12/2016 | Johnson et al. |
| 2017/0223054 | A1 | 8/2017 | Wing et al. |
| 2018/0234388 | A1 * | 8/2018 | Reddy ................... H04L 63/306 |

OTHER PUBLICATIONS

Dierks, et al., "The Transport Layer Security (TLS) Protocol", RFC5246, Aug. 2008, Version 1.2, Network Working Group, 104 pgs (4 parts).

D. Eastlake, "Transport Layer Security (TLS) Extensions: Extension Definitions", Internet Engineering Task Force (IETF), ISSN:2070-1721, RFC6066, Jan. 2011, 25 pgs.

E. Rescorla, "The Transport Layer Security (TLS) Protocol Version 1.3", draft-ietf-tls-tls13-11, Network Working Group, RTFM, Inc., Dec. 28, 2015, 115 pgs (4 parts).

* cited by examiner

ENGAGEMENT AND DISENGAGEMENT OF TRANSPORT LAYER SECURITY PROXY SERVICES WITH ENCRYPTED HANDSHAKING

TECHNICAL FIELD

The present disclosure relates to network environments utilizing Transport Layer Security Proxy Services.

BACKGROUND

Proxy devices equipped to provide Transport Layer Security (TLS) operate by intercepting network traffic flows between clients and servers. Specifically, a TLS proxy serves as an authorized "man-in-the-middle," establishing a first secure connection between the client and the proxy, and a second secure connection between the proxy and the server. With these two secure connections in place, the TLS proxy receives encrypted communications from the client over the first secure connection, and decrypts the communication for examination at the proxy. If it is determined that the traffic should be forwarded to the server, the proxy re-encrypts the traffic according to the second secure connection, and sends the traffic to the server over the second secure connection. The inverse process is also performed where encrypted traffic is received from the server over the second secure connection, decrypted at the proxy, and re-encrypted and sent to the client over the first secure connection.

Due to certain rules, such as privacy laws, decryption of some traffic, such as online banking transactions, might not be permitted. In these situations, the proxy needs to either enter the transaction after it is determined from a direct client-server connection that TLS inspection is allowed, or a TLS connection is initially established which is subsequently broken if it is determined that TLS inspection is not allowed. In either instance, old connections at both the client and server are broken, and new connections are established, a process that is costly at the client, server and proxy. Moreover, breaking established connections may cause operational problems for some clients and servers that operate without awareness of the intervening proxy device.

DESCRIPTION OF EXAMPLE EMBODIMENTS

Overview

Figure 1:
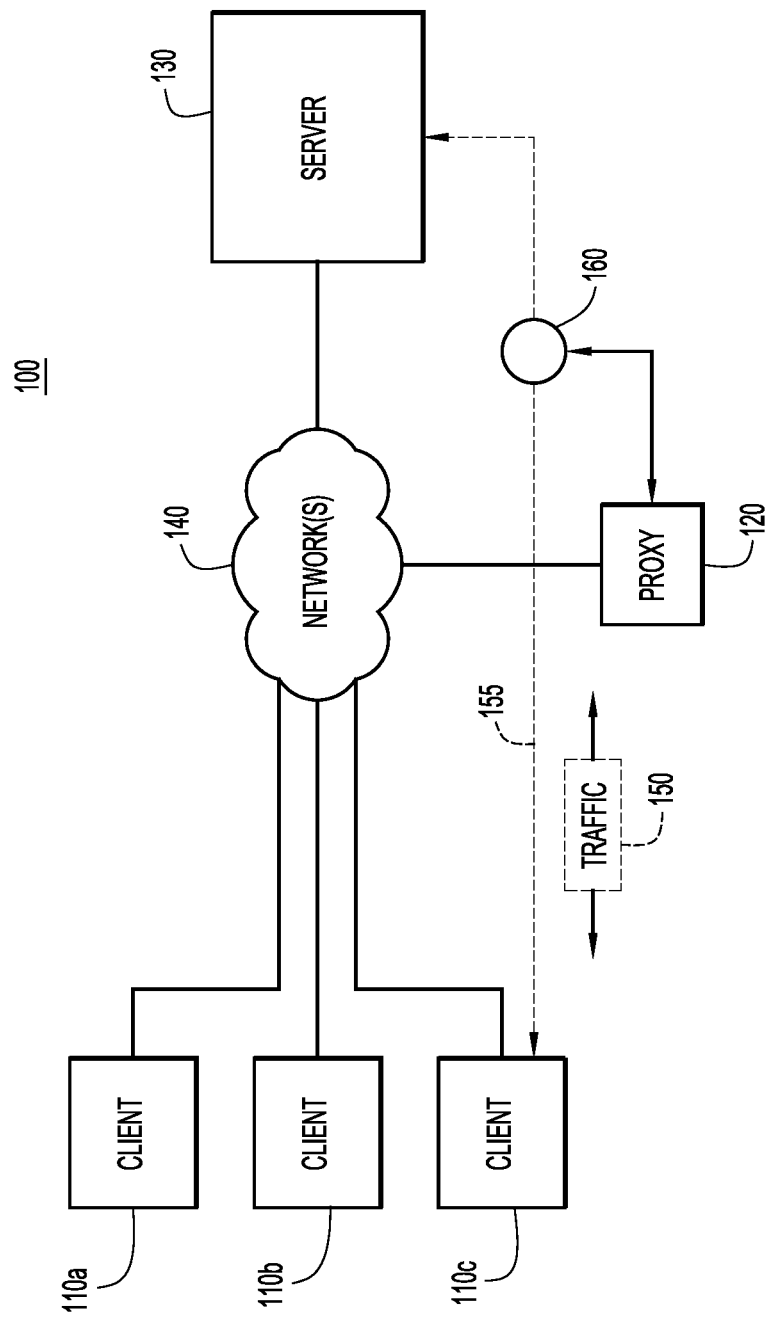
FIG. 1 is a diagram of a computer network in which engagement and disengagement of TLS proxy services with encrypted handshaking are implemented, according to an example embodiment.

Techniques are presented herein for engagement and disengagement of TLS proxy services with encrypted handshaking. A first initial message of a first encrypted handshaking procedure for a first secure communication session between a first device and a second device is intercepted at a proxy device. The first initial message includes at least first key exchange information for encrypting the first encrypted handshaking procedure. A copy of the first initial message of the first encrypted handshaking procedure is stored at the proxy device. A second initial message of a second encrypted handshaking procedure for a second secure communication session between the proxy device and the second device is sent from the proxy device to the second device. The second initial message includes at least second key exchange information for encrypting the second encrypted handshaking procedure. The proxy device determines, based on the second encrypted handshaking procedure, whether to remain engaged between the first device and the second device during the first secure communication session, or to disengage such that inspection of communication traffic during the first secure communication session is not to be performed by the proxy device.

Example Embodiments

Man-in-the-Middle (MITM) proxy and Encrypted Traffic Analysis (ETA) are two different techniques for analyzing encrypted traffic, such as TLS protected traffic. The ability to monitor, inspect, and ultimately control encrypted data traffic is one of the most important functions for network security devices given that breaches emanate from this data, and now, more than 50% of Internet traffic is encrypted, and is expected to increase to 75% by 2019.

ETA and MITM proxy complement each other and both can have important roles in network security devices. For example, ETA is able to flag an endpoint to be suspicious and trigger more stringent control of the traffic, and can lead to applying MITM proxy and decryption of the traffic. Proxy and decryption are one currently practical solution for certain Next-Generation Firewall (NGFW) and Web Proxy use cases, for example, an "acceptable use policy" that leads to the need for granular Application Visibility Control (AVC) (e.g., micro applications), and Uniform Resource Locator (URL) filtering in an enterprise environment.

There are several challenges for the MITM proxy, however, with scalability and end-to-end encryption being the primary issues. Deployed on a middle box, the MITM proxy minimizes the amount of traffic and number of network data flows to be decrypted. Regulatory requirements and local policy requirements may also dictate that traffic to certain sites, such as financial sites, is not to be decrypted. Taken together, this often requires that the MITM proxy disengage after checking the TLS client and server's identity, such as the CN/AltSubName in certificates, so that the rest of the handshake and TLS traffic are not subject to decryption or incur a load on the middle box.

Internet Engineering Task Force (IETF) draft TLS Protocol Version 1.3 provides for enhanced end-to-end encryption and creates new challenges for MITM proxies. The IETF draft TLS 1.3 publication is available at tools.ietforg/html/draft-ietf-tls-tls13-28, which document is incorporated by reference in its entirety. According to the TLS 1.3 protocol, certificate handshake messages are encrypted and the Server Name Indication (SNI) in the ClientHello message may also be encrypted (by use of an extension). As a result, the MITM proxy is not able to passively observe the handshake between a client and server and determine whether or not it should engage or disengage proxy services.

Accordingly, in order for the MITM proxy to observe the certificates in clear text, the MITM proxy participates in the encrypted handshaking from the beginning of the handshaking procedure. However, this creates an issue if the MITM proxy subsequently determines to disengage from the session, because it has actively participated in the encrypted handshaking. The principles of the example embodiments described herein provide techniques for engagement and disengagement of TLS proxy services with encrypted handshaking that gracefully engage or disengage the TLS proxy services with minimal disruption to the user experience at the client side.

Depicted in FIG. 1 is an example embodiment of a network environment 100 in which engagement and disengagement of TLS proxy services with encrypted handshaking may be implemented. In this embodiment, a plurality of client devices, including a first client device 110*a*, a second client device 110*b*, and a third client device 110*c*, are connected to a proxy device 120, and in turn, to a server 130 through a network 140. Proxy device 120 is configured to gracefully engage or disengage TLS proxy services with minimal disruption to the user experience at client devices 110*a*, 110*b*, 110*c* when traffic 150 is communicated between any of the client devices 110*a*, 110*b*, 110*c* and server 130. The proxy device 120 is configured to provide engagement and disengagement of TLS proxy services with encrypted handshaking of a secure communication session, e.g., session 155. Secure communication session 155 may be, for example, network traffic 150 communicated between first client device 110*a* and server 130 through the use of secure keys after an encrypted handshaking procedure. Proxy device 120 may engage and disengage from the establishment of session 155 as shown at 160, and as described in more detail hereinafter in connection with FIGS. 2-9.

Figure 2:
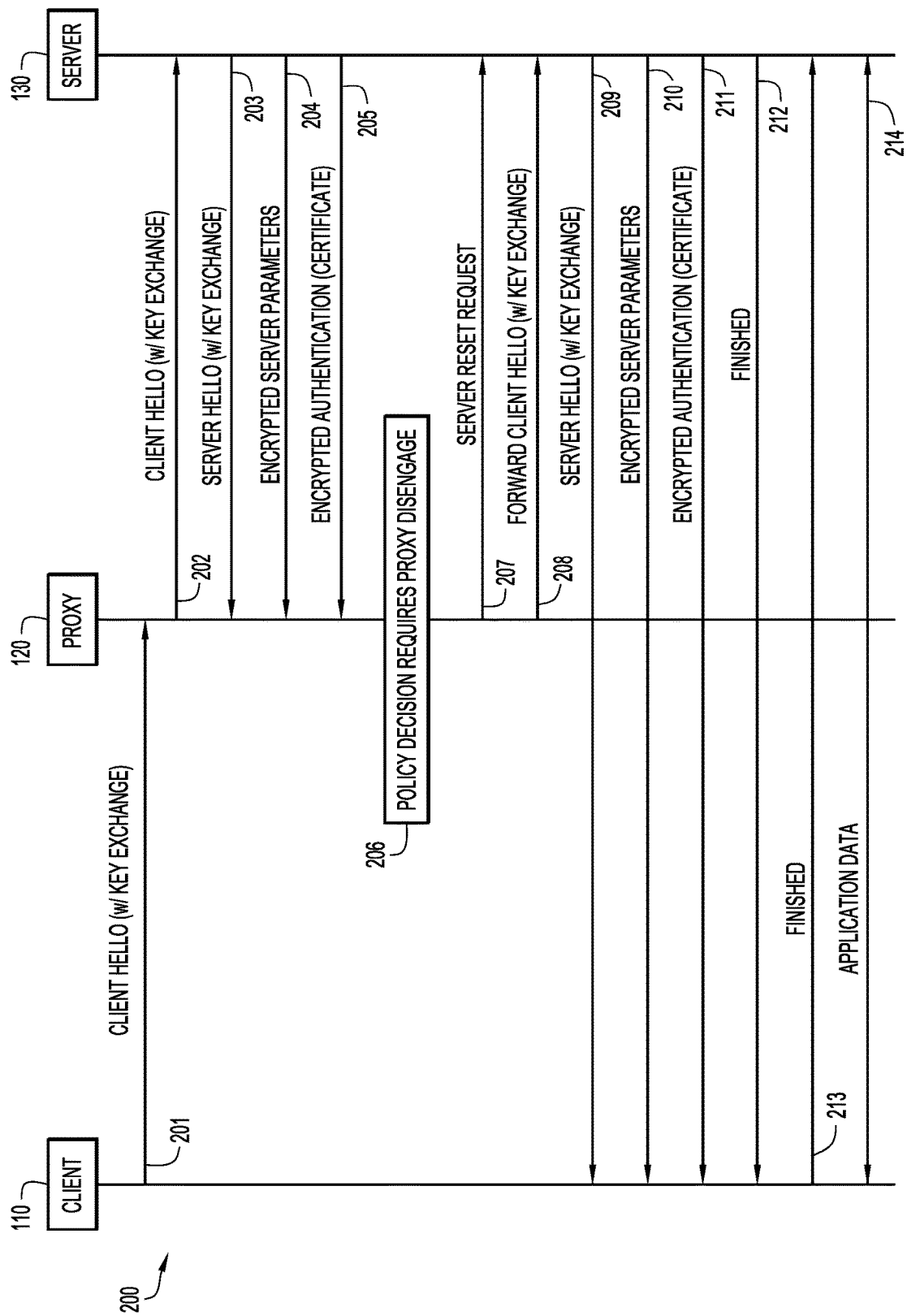
FIG. 2 is a ladder diagram for disengagement of TLS proxy services with encrypted handshaking, according to an example embodiment.

Referring now to FIG. 2, a ladder/sequence diagram 200 is illustrated in which proxy device 120 disengages from a secure connection between client device 110 and server 130. In this embodiment, message 201 comprises a client hello message sent from client device 110 to server 130 in order to initiate an encrypted handshaking procedure. As part of message 201, client device 110 also includes key exchange information with message 201. The key exchange information provided as part of the encrypted handshaking procedure allows client device 110 and server 130 to negotiate a protocol version, select cryptographic algorithms, optionally authenticate each other, and establish shared secret keying material. In addition to key exchange information, other extensions or information may be provided with message 201, including, for example, information from a prior session, as will be further described below.

In some embodiments, key exchange information may include different key exchange modes, including Diffie-Hellman key exchange (DHE) over either finite fields or elliptic curves, pre-shared keys (PSK) alone, and/or PSK with DHE.

In this embodiment, the client hello message 201 is intercepted by and stored at proxy device 120. Client hello message 201 is not immediately forwarded to server 130, and server 130 is not yet aware that client device 110 is attempting to initiate a secure connection with server 130.

With client hello (ClientHello) message 201 held at proxy device 120, proxy device 120 sends a new client hello message 202 to server 130. Client hello message 202 from proxy device 120 is based on the stored copy of client hello message 201 in that it is configured to establish a similar encrypted handshaking procedure, but instead of establishing a secure connection between client device 110 and server 130, the client hello message 202 is configured to establish a secure connection between proxy device 120 and server 130. Additionally, client hello message 202 from proxy device 120 includes key exchange information that is needed to establish the encrypted handshaking procedure with server 130. In some embodiments, the key exchange information provided in client hello message 202 may be based on information from the key exchange information in client hello message 201 from client device 110. For example, the key exchange information in client hello message 202 may use the same cipher suite as that used by the key exchange information in client hello message 201 from client device 110 to generate new keying materials (e.g., the ephemeral Diffie-Hellman parameters) for the key exchange information included in client hello message 202 from proxy device 120.

Upon receiving client hello message 202, server 130 sends a server hello message 203 to proxy device 120. In this embodiment, server hello message 203 also includes the corresponding key exchange information based on the key exchange information provided with client hello message 202 to encrypt the handshaking procedure. Accordingly, the remaining communications between proxy device 120 and server 130 during the handshaking procedure will be encrypted according to the shared key exchange information.

Next, server 130 sends a message 204 that includes encrypted server parameters for the handshaking procedure. For example, server parameters may include other handshake parameters such as whether the client device is authenticated, application layer protocol support, or other information. Server 130 also sends a message 205 that includes an encrypted authentication credential for server 130, for example, a security certificate.

Proxy device 120 decrypts the encrypted authentication received in message 205 using the cryptographic parameters established by the key exchange information for the encrypted handshaking procedure. Proxy device 120 may apply a policy determination to disengage or to remain engaged. The policy determination may be based on one or more factors, such as a server authentication (e.g., certificate), cipher suite used by the server, location, or other attributes. In this example, based on the authentication (e.g., certificate) contained in message 205, proxy device 120 determines whether or not TLS proxy services should be applied to communication traffic during the secure communication session between client device 110 and server 130. For example, if the Domain Name System (DNS) server name for server 130 indicated in the certificate is "Bank A," proxy device 120 may determine that the connection between client device 110 and server 130 would fall into the online banking information category. Because of pre-established policy decisions, for example, privacy laws that may prohibit the decryption of online banking information, proxy device 120 may determine that TLS proxy services are to be disengaged for a connection established between client device 110 and server 130, as shown at 206. In some embodiments, proxy device 120 may store information associated with server 130 and/or details of the authentication (e.g., certificate) from messages 203, 204, 205 with an appropriate time to live (TTL) to avoid repeated transactions with the same server 130 to validate its credentials.

Additionally, in some embodiments, proxy device 120 may contact a policy server (not shown) to request or receive an applicable policy determination to disengage or to remain engaged between client device 110 and server 130. For example, proxy device 120 may use an out-of-band communication channel to send and receive information regarding server 130 to the policy server to reach the policy determination for the session.

In this embodiment, because the policy requires proxy device 120 to disengage, proxy device 120 sends a Transmission Control Protocol (TCP) reset request message 207, for example, a TCP RST or TCP FIN packet, to server 130, while maintaining a TCP connection with client device 110. As a result, client device 110 is unaware of any disruption to the encrypted handshaking procedure from the client-side. Next, proxy device 120 initiates a new TCP connection with server 130, and associates it with the TCP connection with client device 110, if necessary. Then, proxy device 120 replays the original client hello message 201 received from client device 110 by forwarding the stored copy of client hello message that was cached at proxy device 120 to server 130 in a forwarded client hello message 208. The forwarded client hello message 208 also includes the key exchange information for the encrypted handshaking procedure that was included with the original client hello message 201.

Upon receiving a server hello message 209 at the proxy device 120 from server 130 in response to the forwarded client hello message 208, proxy device 120 passes server hello message 209 through to client device 110. Server hello message 209 includes the corresponding key exchange information based on the key exchange information provided with forwarded client hello message 208 to encrypt the handshaking procedure between client device 110 and server 130.

At this point, proxy device 120 is disengaged from the secure communication session between client device 110 and server 130 and will not examine any communication traffic between client device 110 and server 130. Thus, client device 110 and server 130 may complete the encrypted handshaking procedure without interception of secure messages by proxy device 120. Accordingly, in addition to server hello message 209, server 130 also sends a message 210 that includes encrypted server parameters for the handshaking procedure, and a message 211 that includes an encrypted authentication for server 130 (e.g., certificate), as described above.

Client device 110 and server 130 complete their encrypted handshaking procedure through messages 212, 213 without inspection from proxy device 120. Upon completion of the handshaking procedure, client device 110 and server 130 begin sending application data 214 over a secure communication session without TLS proxy services conducting inspection of the traffic. Because original client hello message 201 was stored at proxy device 120 without any indication to client device 110 that proxy device 120 was proceeding with its own encrypted handshaking, the encrypted handshaking procedure between client device 110 and server 130 proceeds without any interruption from the perspective of client device 110.

Figure 3:
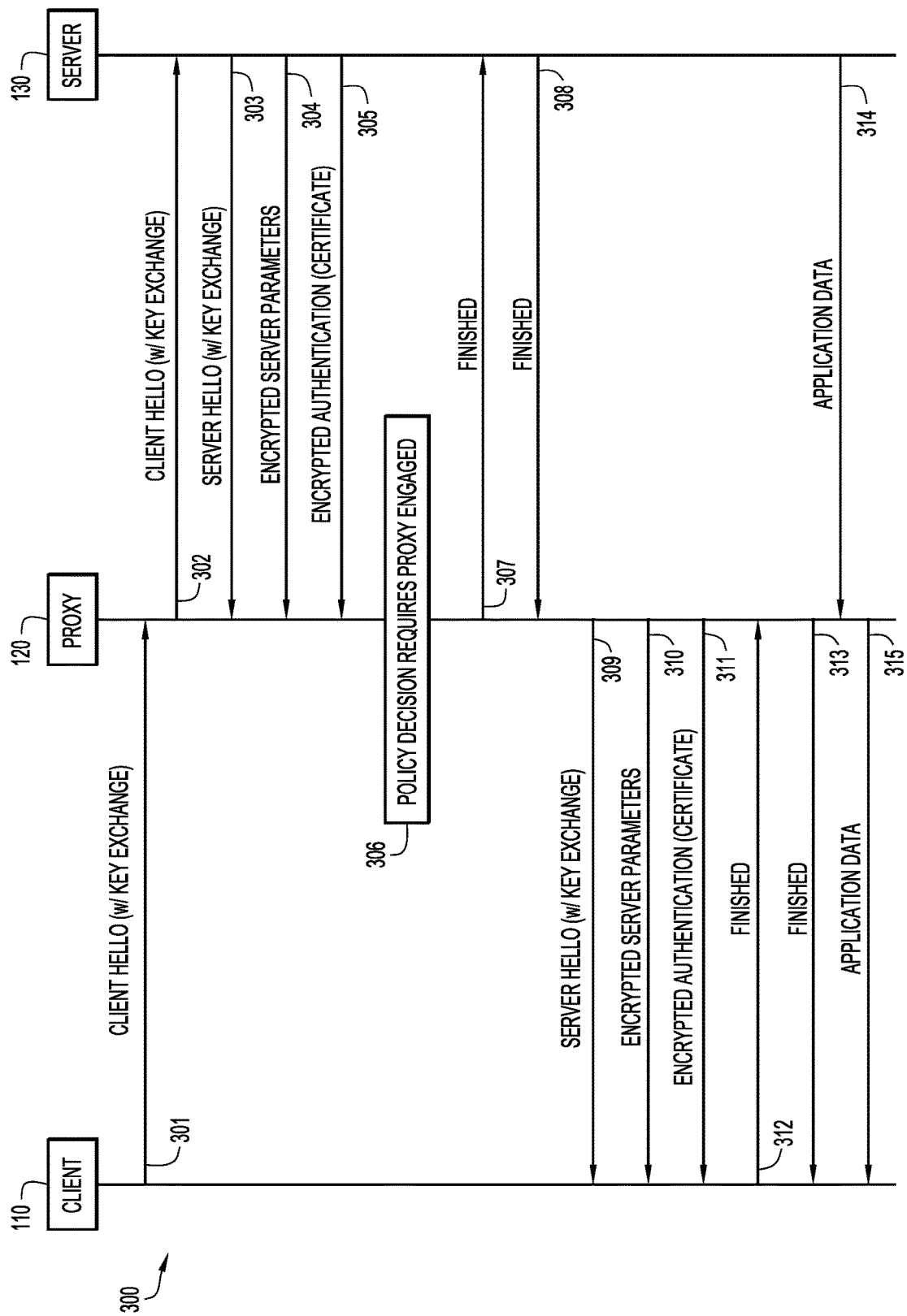
FIG. 3 is a ladder diagram for engagement of TLS proxy services with encrypted handshaking, according to an example embodiment.

Referring now to FIG. 3, a ladder diagram 300 is shown which illustrates an initial exchange similar to that depicted in FIG. 2, but in which proxy device 120 remains engaged during a secure connection between client device 110 and server 130 to examine communication traffic. In this embodiment, message 301 comprises a client hello message sent from client device 110 to server 130 in order to initiate an encrypted handshaking procedure. As part of client hello message 301, client device 110 also includes key exchange information for the encrypted handshaking procedure, as well as other extensions or other information, as described above.

In this embodiment, the client hello message 301 is again intercepted by and stored at proxy device 120. Client hello message 301 is not immediately forwarded to server 130, and server 130 is not yet aware that client device 110 is attempting to initiate a secure connection with server 130. With client hello message 301 stored at proxy device 120, proxy device 120 sends a new client hello message 302 to server 130. Client hello message 302 from proxy device 120 is based on the stored copy of client hello message 301 in that it is configured to establish a similar encrypted handshaking procedure, but instead of establishing a secure connection between client device 110 and server 130, the client hello message 302 is configured to establish a secure connection between proxy device 120 and server 130. Additionally, client hello message 302 from proxy device 120 includes key exchange information using new keying materials for proxy device 120 and may also include extensions or other information provided in client hello message 301 from client device 110 that is needed to establish the encrypted handshaking procedure with server 130.

Upon receiving client hello message 302, server 130 sends a server hello message 303 to proxy device 120. In this embodiment, server hello message 303 also includes the corresponding key exchange information based on the key exchange information provided with client hello message 302 to encrypt the handshaking procedure. Accordingly, the remaining communications between proxy device 120 and server 130 during the handshaking procedure will be encrypted according to the shared key exchange information.

Next, server 130 sends a message 304 that includes encrypted server parameters for the handshaking procedure and a message 305 that includes an encrypted authentication for server 130, for example, a security certificate. Proxy device 120 decrypts the encrypted authentication received in message 305 using the cryptographic parameters established by the key exchange information for the encrypted handshaking procedure. Based on the authentication (e.g., certificate) contained in message 305, such as the DNS server name and/or category of server 130, proxy device 120 determines whether or not TLS proxy services should be applied to communication traffic during the secure communication session between client device 110 and server 130 at 306. In this embodiment, proxy device 120 has determined at 306, for example, based on pre-established policy decisions, that TLS proxy services are to be engaged to examine traffic during a secure communication session established between client device 110 and server 130.

As a result, proxy device 120 completes the encrypted handshaking procedure with server 130 through messages 307, 308 to establish a secure connection with server 130. Proxy device 120 also responds to client hello message 301 from client device 110 to establish a separate encrypted handshaking procedure with client device 110 for a secure connection between client device 110 and proxy device 120. In this embodiment, proxy device 120 responds to client hello message 301 from client device 110 with a server hello message 309 that is based on a stored copy of the server hello message 303 initially received by proxy device 120 from server 130. For example, server hello message 309 generated by proxy device 120 may indicate to client device 110 the ciphers, extensions, and/or other information supported by server 130 as indicated by the server hello message 303. In the case where server 130 supports ciphers, extensions, and/or other information that cannot be supported by proxy device 120, proxy device 120 may strip out the non-supported information from server hello message 309. Server hello message 309 also includes key exchange information to encrypt the handshaking procedure between client device 110 and proxy device 120. Accordingly, the remaining communications between client device 110 and proxy device 120 during the handshaking procedure will be encrypted according to the shared key exchange information. Additional messages, such as a message 310 that includes encrypted server parameters for the handshaking procedure and a message 311 that includes an encrypted authentication for server 130, for example, a security certificate, may also be provided from proxy device 120 to client device 110 based on stored copies of messages 304, 305. For example, proxy device 120 may generate a new authentication (e.g., certificate) for message 311 that purports to be from server 130, but that is signed by proxy device 120 using the authentication (e.g., certificate) from server 130 contained in message 305 received by proxy device 120.

Client device 110 and proxy device 120 complete their encrypted handshaking procedure through messages 312, 313 to establish a separate secure communication session between the client device 110 and proxy device 120. At this point, proxy device 120 will maintain two separate, distinct TLS sessions, a first secure communication session between proxy device 120 and client device 110 and a second secure communication session between proxy device 120 and server 130, to examine all traffic between client device 110 and server 130. Accordingly, when server 130 sends application data 314, proxy device 120 receives and may examine the traffic before sending application data 315 to client device 110.

Additionally, proxy device 120 may store the transaction state for the client device 110 and server 130 Internet Protocol (IP) addresses (with a TTL), along with session information, such as a desired pre_shared_key, psk_key_exchange_modes, and other extensions, to be used as prior session information to allow for session resumption and/or zero round trip time resumption (0-RTT) flows, as will be described further below.

In addition to a full encrypted handshaking procedure, TLS Protocol 1.3 also includes provisions for allowing a client device to implement session resumption and/or 0-RTT features. FIGS. 4 through 7 will illustrate principles of the embodiments described herein for engagement and disengagement of TLS proxy services with encrypted handshaking that include session resumption and/or 0-RTT scenarios.

Figure 4:
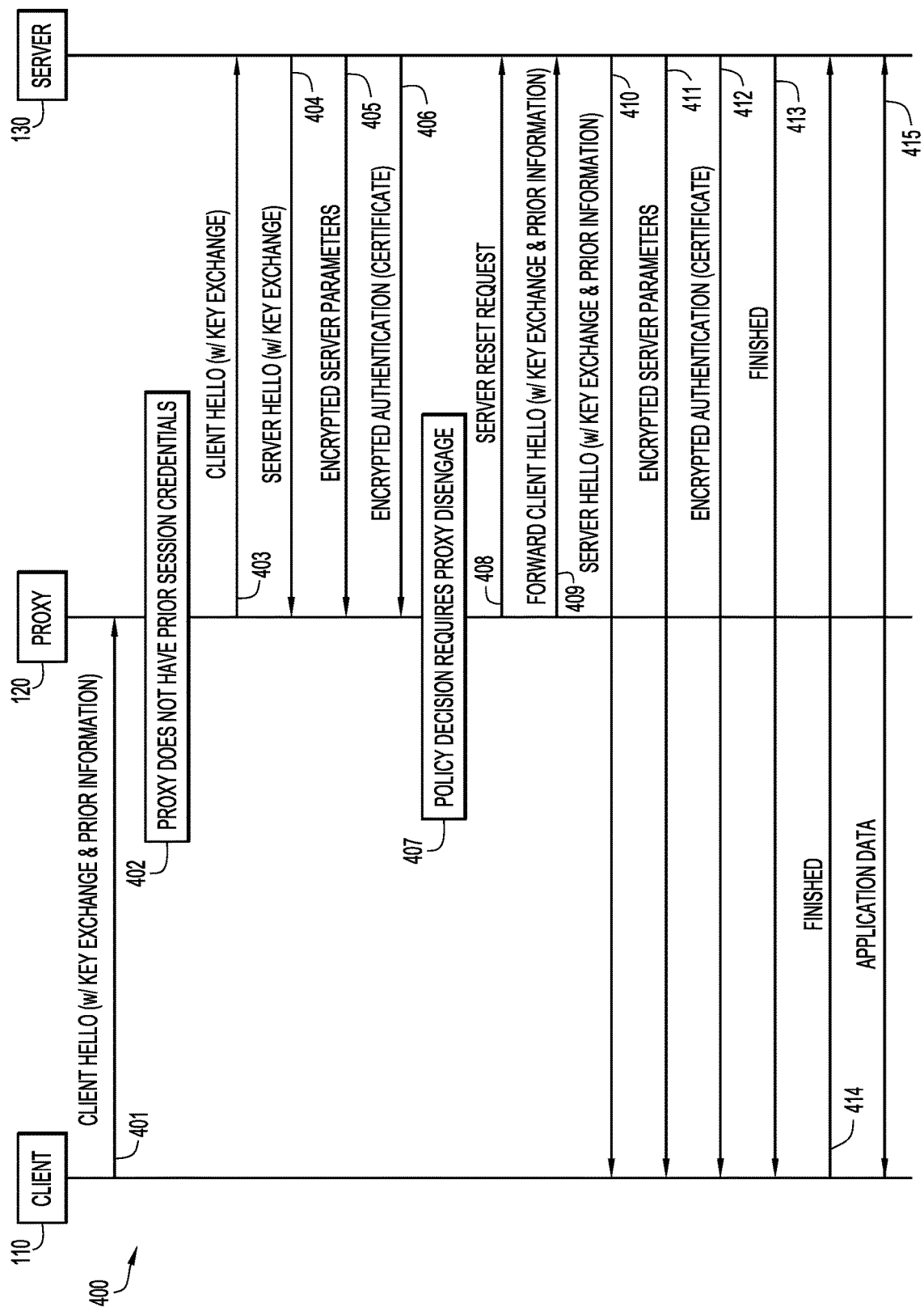
FIG. 4 is a ladder diagram for disengagement of TLS proxy services with encrypted handshaking that includes prior session information, where the proxy does not have the prior session credentials, according to an example embodiment.
Figure 5:
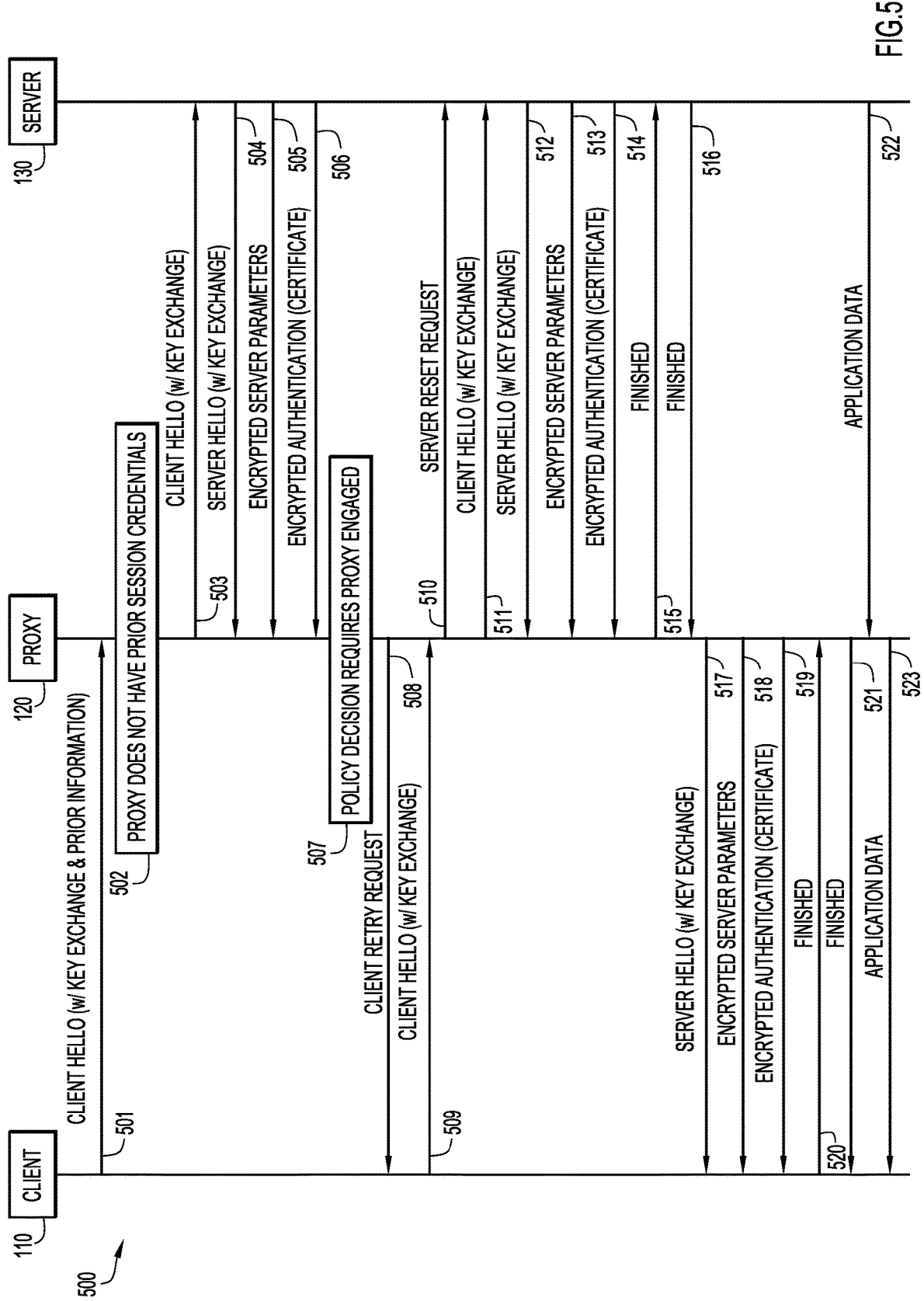
FIG. 5 is a ladder diagram for engagement of TLS proxy services with encrypted handshaking that includes prior session information, where the proxy does not have the prior session credentials, according to an example embodiment.
Figure 6:
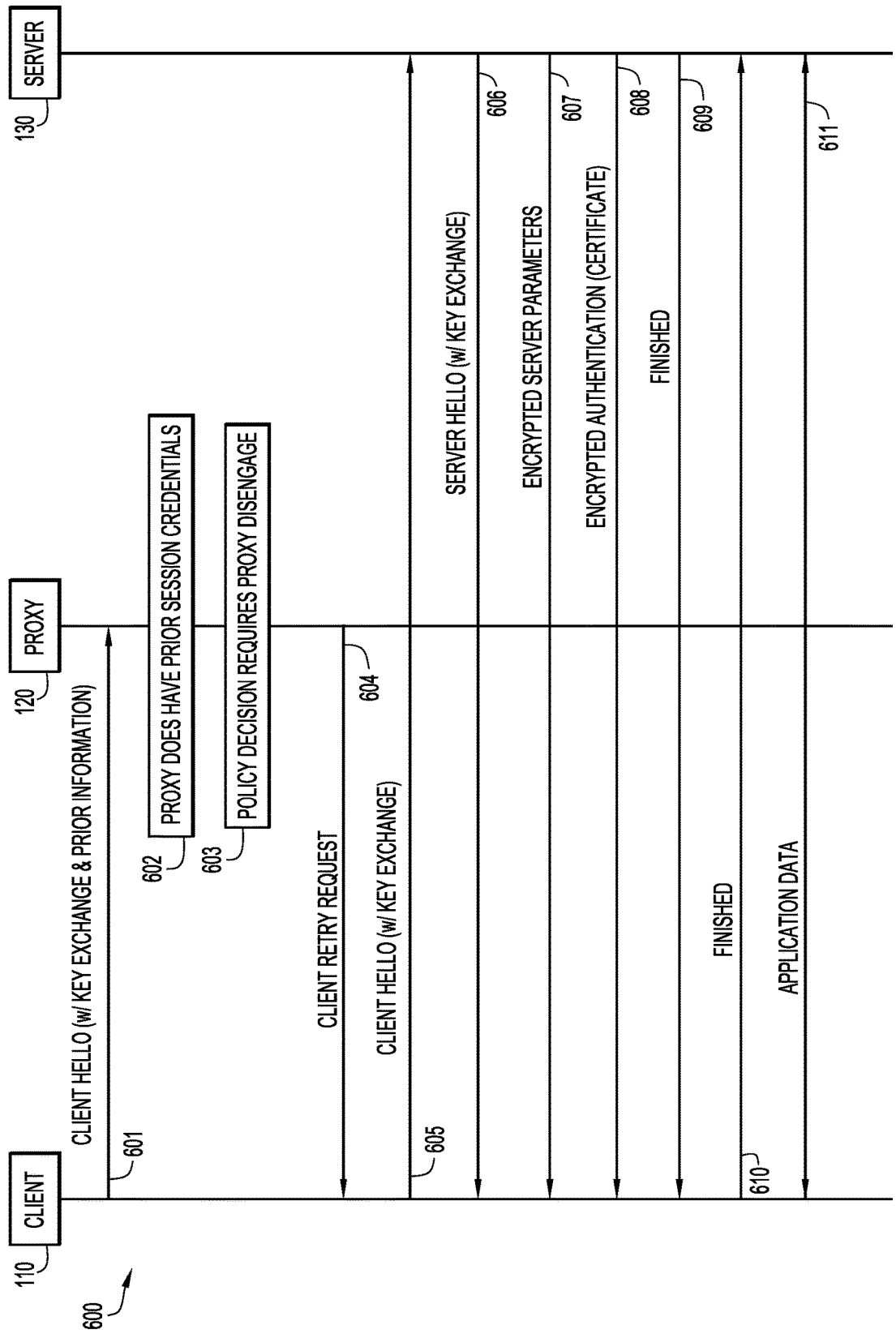
FIG. 6 is a ladder diagram for disengagement of TLS proxy services with encrypted handshaking that includes prior session information, where the proxy has the prior session credentials, according to an example embodiment.
Figure 7:
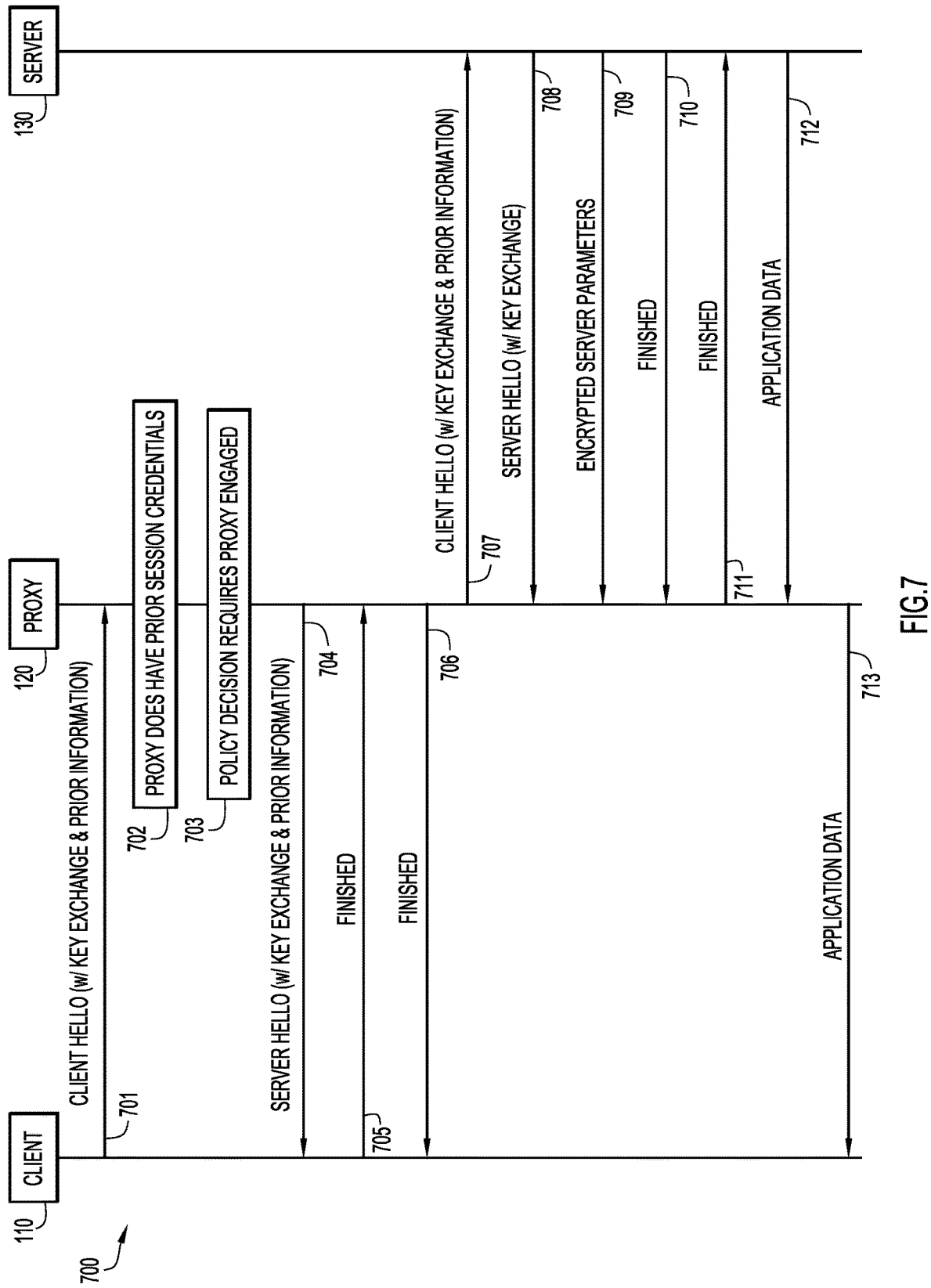
FIG. 7 is a ladder diagram for engagement of TLS proxy services with encrypted handshaking that includes prior session information, where the proxy has the prior session credentials, according to an example embodiment.

As will be described in more detail below, FIGS. 4 and 5 illustrate the process for engagement and disengagement of TLS proxy services where the proxy device does not have prior session information. FIGS. 6 and 7 illustrate the process for engagement and disengagement of TLS proxy services where the proxy device has prior session information.

Turning now to FIG. 4, a ladder diagram 400 is illustrated in which client device 110 is resuming a prior session or initiating a 0-RTT and proxy device 120 disengages from the secure connection between client device 110 and server 130. In this embodiment, message 401 comprises a client hello message sent from client device 110 to server 130 in order to initiate an encrypted handshaking procedure. In this embodiment, client hello message 401 includes key exchange information, as described above, and also includes prior information associated with a previous encrypted handshaking procedure and/or a prior secure communication session between client device 110 and server 130. For example, the prior information sent along with client hello message 401 may be included to initiate session resumption and/or 0-RTT features of the TLS Protocol 1.3.

In this embodiment, the client hello message 401 is intercepted by and stored at proxy device 120. Client hello message 401 is not immediately forwarded to server 130, and server 130 is not yet aware that client device 110 is attempting to resume a secure connection with server 130. Based on the prior information included with client hello message 401, proxy device 120 determines whether previous session credentials associated with the previous encrypted handshaking procedure and/or a prior secure communication session between client device 110 and server 130 are stored at the proxy device 120. In this embodiment, proxy device 120 determines at 402 that previous session credentials are not stored.

With client hello message 401 held at proxy device 120, proxy device 120 sends a new client hello message 403 to server 130. Client hello message 403 from proxy device 120 is based on the stored copy of client hello message 401 in that it is configured to establish a similar encrypted handshaking procedure, but instead of establishing a secure connection between client device 110 and server 130, the client hello message 403 is configured to establish a secure connection between proxy device 120 and server 130. Additionally, client hello message 403 from proxy device 120 includes key exchange information that is needed to establish the encrypted handshaking procedure with server 130.

Upon receiving client hello message 403, server 130 sends a server hello message 404 to proxy device 120. In this embodiment, server hello message 404 also includes the corresponding key exchange information based on the key exchange information provided with client hello message 403 to encrypt the handshaking procedure. Accordingly, the remaining communications between proxy device 120 and server 130 during the handshaking procedure will be encrypted according to the shared key exchange information between proxy device 120 and server 130. Server 130 also sends a message 405 that includes encrypted server parameters for the handshaking procedure and a message 406 that includes an encrypted authentication for server 130, for example, a security certificate.

Proxy device 120 decrypts the encrypted authentication received in message 406 using the cryptographic parameters established by the key exchange information for the encrypted handshaking procedure. Based on the authentication (e.g., certificate) contained in message 406, such as the DNS server name and/or category of server 130, proxy device 120 determines whether or not TLS proxy services should be applied to communication traffic during the secure communication session between client device 110 and server 130 at 407. In this embodiment, proxy device 120 has determined at 407, for example, based on pre-established policy decisions, that TLS proxy services are to be disengaged during the secure communication session established between client device 110 and server 130 such that proxy device 120 does not examine the communication traffic.

In this embodiment, because the policy requires proxy device 120 to disengage, proxy device 120 sends a TCP reset request message 408 to server 130, while maintaining a TCP connection with client device 110. As a result, client device 110 is unaware of any disruption to the encrypted handshaking procedure from the client-side. Next, proxy device 120 initiates a new TCP connection with server 130, and associates it with the TCP connection with client device 110, if necessary. Then, proxy device 120 replays the original client hello message 401 received from client device 110 by forwarding the stored copy of client hello message that was cached at proxy device 120 to server 130 in a forwarded client hello message 409. The forwarded client hello message 409 also includes the key exchange information for the encrypted handshaking procedure and the prior information associated with the previous encrypted handshaking procedure and/or prior secure communication session that was included with the original client hello message 401.

Upon receiving a server hello message 410 at the proxy device 120 from server 130 in response to the forwarded client hello message 409, proxy device 120 passes server hello message 410 through to client device 110. Server hello message 410 includes the corresponding key exchange information based on the key exchange information provided with forwarded client hello message 409 to encrypt the handshaking procedure between client device 110 and server 130, as well as the prior information associated with the previous encrypted handshaking procedure to allow for session resumption and/or 0-RTT between client device 110 and server 130.

At this point, proxy device 120 is disengaged from the secure communication session between client device 110 and server 130 and will not examine any communication traffic between client device 110 and server 130. Thus, client device 110 and server 130 may complete the encrypted handshaking procedure without interception of secure messages by proxy device 120. Accordingly, in addition to server hello message 410, server 130 also sends a message 411 that includes encrypted server parameters for the handshaking procedure, and a message 412 that includes an encrypted authentication for server 130 (e.g., certificate), as described above.

Client device 110 and server 130 complete their encrypted handshaking procedure through messages 413, 414 without inspection from proxy device 120. Upon completion of the handshaking procedure, client device 110 and server 130 resume sending application data 415 over a secure communication session without TLS proxy services examining the traffic. Because original client hello message 401 was stored at proxy device 120 without any indication to client device 110 that proxy device 120 was proceeding with its own encrypted handshaking, the encrypted handshaking procedure between client device 110 and server 130 proceeds without any interruption from the perspective of client device 110.

Referring now to FIG. 5, a ladder diagram 500 is illustrated in which client device 110 is resuming a prior session or initiating a 0-RTT and proxy device 120 remains engaged during the secure connection between client device 110 and server 130. In this embodiment, message 501 comprises a client hello message sent from client device 110 to server 130 in order to initiate an encrypted handshaking procedure. In this embodiment, client hello message 501 includes key exchange information, as described above, and also includes prior information associated with a previous encrypted handshaking procedure and/or a prior secure communication session between client device 110 and server 130. For example, the prior information sent along with client hello message 501 may be included to initiate session resumption and/or 0-RTT features of the TLS Protocol 1.3.

In this embodiment, the client hello message 501 is intercepted by and stored at proxy device 120. Client hello message 501 is not immediately forwarded to server 130, and server 130 is not yet aware that client device 110 is attempting to resume a secure connection with server 130. Based on the prior information included with client hello message 501, proxy device 120 determines whether previous session credentials associated with the previous encrypted handshaking procedure and/or prior secure communication session between client device 110 and server 130 are stored at the proxy device 120. In this embodiment, proxy device 120 determines at 502 that previous session credentials are not stored.

With client hello message 501 held at proxy device 120, proxy device 120 sends a new client hello message 503 to server 130. Client hello message 503 from proxy device 120 is based on the stored copy of client hello message 501 in that it is configured to establish a similar encrypted handshaking procedure, but instead of establishing a secure connection between client device 110 and server 130, the client hello message 503 is configured to establish a secure connection between proxy device 120 and server 130. Additionally, client hello message 503 from proxy device 120 includes key exchange information that is needed to establish the encrypted handshaking procedure with server 130.

Upon receiving client hello message 503, server 130 sends a server hello message 504 to proxy device 120. In this embodiment, server hello message 504 also includes the corresponding key exchange information based on the key exchange information provided with client hello message 503 to encrypt the handshaking procedure. Accordingly, the remaining communications between proxy device 120 and server 130 during the handshaking procedure will be encrypted according to the shared key exchange information between proxy device 120 and server 130. Server 130 also sends a message 505 that includes encrypted server parameters for the handshaking procedure and a message 506 that includes an encrypted authentication for server 130, for example, a security certificate.

Proxy device 120 decrypts the encrypted authentication received in message 506 using the cryptographic parameters established by the key exchange information for the encrypted handshaking procedure. Based on the authentication (e.g., certificate) contained in message 506, such as the DNS server name and/or category of server 130, proxy device 120 determines whether or not TLS proxy services should be applied to communication traffic during the secure communication session between client device 110 and server 130 at 507. In this embodiment, proxy device 120 has determined at 507, for example, based on pre-established policy decisions, that TLS proxy services are to remain engaged during the secure communication session established between client device 110 and server 130 so that proxy device 120 may intercept and examine the communication traffic.

Accordingly, because the policy requires proxy device 120 to remain engaged, proxy device 120 sends a client retry request message 508 to client device 110. For example, client retry request message 508 may be a TLS HelloRetryRequest. Client retry request message 508 indicates to client device 110 that server 130 does not have enough information to continue with the encrypted handshake procedure. That is, because proxy device 120 has determined at 502 that it does not have the prior session credentials stored for session resumption or 0-RTT, proxy device 120 needs to restart a full encrypted handshaking procedure to remain engaged between client device 110 and server 130. In response to the client retry request message 508, client device 110 sends a new client hello message 509 that includes key exchange information, but does not include the prior information associated with a previous encrypted handshaking procedure that was included in client hello message 501.

New client hello message 509 is intercepted by and stored at proxy device 120. Proxy device 120 also sends a server reset request message 510 to server 130. For example, server reset request message 510 may be a TCP reset request message to re-initiate a full encrypted handshaking procedure between proxy device 120 and server 130. In this case, the TCP connection may be reset because there is no incentive to persist with the already established session. For example, because the client hello extensions used to setup the session could be different from the extensions that may be sent for subsequent sessions. Accordingly, server reset request message 510 is used to re-establish a new encrypted handshaking procedure between proxy device 120 and server 130.

Next, proxy device 120 sends a new client hello message 511 to server 130. New client hello message 511 from proxy device 120 is based on the intercepted new client hello message 509 sent from client device 110 in response to client retry request message 508 and is configured to establish an encrypted handshaking procedure between proxy device 120 and server 130. Additionally, new client hello message 511 from proxy device 120 includes key exchange information and may also include extensions or other information provided in new client hello message 509 from client device 110 that is needed to establish the encrypted handshaking procedure with server 130.

Upon receiving new client hello message 511, server 130 sends a server hello message 512 to proxy device 120. In this embodiment, server hello message 512 also includes the corresponding key exchange information based on the key exchange information provided with new client hello message 511 to encrypt the handshaking procedure between proxy device 120 and server 130. Accordingly, the remaining communications between proxy device 120 and server 130 during the handshaking procedure will be encrypted according to the shared key exchange information between proxy device 120 and server 130. Next, server 130 sends a message 513 that includes encrypted server parameters for the handshaking procedure and a message 514 that includes an encrypted authentication for server 130, for example, a security certificate.

Proxy device 120 completes the encrypted handshaking procedure with server 130 through messages 515, 516 to establish a secure connection with server 130. In some embodiments, upon intercepting new client hello message 509, as described above, proxy device 120 may determine that the current TLS session between proxy device 120 and server 130 may be re-used instead of initiating a new session. For example, proxy device 120 may inspect the intercepted new client hello message 509 and determine that the information, for example, extensions or other information, is sufficiently similar to the already established session so that the current TLS session between proxy device 120 and server 130 can be maintained.

Proxy device 120 also responds to new client hello message 509 from client device 110 to establish a separate encrypted handshaking procedure with client device 110 for a secure connection between client device 110 and proxy device 120. In this embodiment, proxy device 120 responds to new client hello message 509 from client device 110 with a server hello message 517 that is based on a stored copy of the server hello message 512 previously received by proxy device 120 from server 130. Server hello message 517 also includes the corresponding key exchange information needed to encrypt the handshaking procedure between client device 110 and proxy device 120. Accordingly, the remaining communications between client device 110 and proxy device 120 during the handshaking procedure will be encrypted according to the shared key exchange information between client device 110 and proxy device 120. Additional messages, such as a message 518 that includes encrypted server parameters for the handshaking procedure and a message 519 that includes an encrypted authentication for server 130, for example, a security certificate, may also be provided from proxy device 120 to client device 110 using stored copies of messages 513, 514. For example, proxy device 120 may generate a new authentication (e.g., certificate) for message 519 that purports to be from server 130, but that is signed by proxy device 120 using the authentication (e.g., certificate) from server 130 contained in message 514 received by proxy device 120.

Client device 110 and proxy device 120 complete their encrypted handshaking procedure through messages 520, 521 to establish a separate secure communication session between the client device 110 and proxy device 120. At this point, proxy device 120 will maintain two separate, distinct TLS sessions, a first secure communication session between proxy device 120 and client device 110 and a second secure communication session between proxy device 120 and server 130, to examine all traffic between client device 110 and server 130. Accordingly, when server 130 sends application data 522, proxy device 120 receives and may inspect or examine the traffic before sending application data 523 to client device 110.

Referring now to FIG. 6, a ladder diagram 600 is illustrated in which client device 110 is resuming a prior session or initiating a 0-RTT and proxy device 120 disengages from the secure connection between client device 110 and server 130. In this embodiment, message 601 comprises a client hello message sent from client device 110 to server 130 in order to initiate an encrypted handshaking procedure. Client hello message 601 includes key exchange information, as described above, and also includes prior information associated with a previous encrypted handshaking procedure and/or a prior secure communication session between client device 110 and server 130. For example, the prior information sent along with client hello message 601 may be included to initiate session resumption and/or 0-RTT features of the TLS Protocol 1.3.

In this embodiment, the client hello message 601 is intercepted by and stored at proxy device 120. Client hello message 601 is not immediately forwarded to server 130, and server 130 is not yet aware that client device 110 is attempting to resume a secure connection with server 130. Based on the prior information included with client hello message 601, proxy device 120 determines whether previous session credentials associated with the previous encrypted handshaking procedure and/or a prior secure communication session between client device 110 and server 130 are stored at the proxy device 120. In contrast to the scenario described with reference to FIG. 4, in this embodiment, proxy device 120 determines at 602 that it has stored prior session credentials associated with previous encrypted handshaking procedure(s) and/or prior secure communication session(s) between client device 110, proxy device 120, and server 130. For example, prior session credentials associated with a previous encrypted handshaking procedure and/or a prior secure communication session between client device 110 and proxy device 120, and prior session credentials associated with a previous encrypted handshaking procedure and/or a prior secure communication session between proxy device 120 and server 130.

Because proxy device 120 has stored prior session credentials at 602, proxy device 120 also has the requisite server authentication information (e.g., certificate) to make a policy decision regarding whether or not proxy device 120 is to remain engaged between client device 110 and server 130 or is to disengage. Next, at 603, proxy device 120 uses the stored prior session credentials at 602, including server authentication information to determine that TLS proxy services are to be disengaged during the secure communication session established between client device 110 and server 130 such that proxy device 120 does not examine the secure communication traffic.

In this embodiment, because the policy requires proxy device 120 to disengage, proxy device 120 sends a client retry request message 604 to client device 110. For example, client retry request message 604 may be a TLS HelloRetryRequest. Client retry request message 604 indicates to client device 110 that server 130 does not have enough information to continue with the encrypted handshake procedure. That is, because proxy device 120 has determined at 603 that it is to disengage between client device 110 and server 130, proxy device 120 restarts a full encrypted handshaking procedure directly between client device 110 and server 130. At this point, proxy device 120 is disengaged from the encrypted handshaking procedure and subsequent secure communication session between client device 110 and server 130 and will not examine any communication traffic between client device 110 and server 130.

In response to the client retry request message 604, client device 110 sends a new client hello message 605 that includes key exchange information that is passed through by proxy device 120 and is received by server 130. Server 130 sends a server hello message 606 that is passed through by proxy device 120 and is received by client device 110. Server hello message 606 includes the corresponding key exchange information based on the key exchange information provided with client hello message 605 to encrypt the handshaking procedure between client device 110 and server 130.

Because proxy device 120 has already disengaged, client device 110 and server 130 may complete the encrypted handshaking procedure without interception of secure messages by proxy device 120. Accordingly, in addition to server hello message 606, server 130 also sends a message 607 that includes encrypted server parameters for the handshaking procedure, and a message 608 that includes an encrypted authentication for server 130 (e.g., certificate), as described above.

Client device 110 and server 130 complete their encrypted handshaking procedure through messages 609, 610 without inspection from proxy device 120. Upon completion of the handshaking procedure, client device 110 and server 130 begin sending application data 611 over a secure communication session without TLS proxy services conducting inspection of the traffic.

Referring now to FIG. 7, a ladder diagram 700 is illustrated in which client device 110 is resuming a prior session or initiating a 0-RTT and proxy device 120 remains engaged during the secure connection between client device 110 and server 130. In this embodiment, message 701 comprises a client hello message sent from client device 110 to server 130 in order to initiate an encrypted handshaking procedure. Client hello message 701 includes key exchange information, as described above, and also includes prior information associated with previous encrypted handshaking procedure(s) and/or prior secure communication session(s) between client device 110, proxy device 120, and server 130. For example, the prior information sent along with client hello message 701 may be included to initiate session resumption and/or 0-RTT features of the TLS Protocol 1.3.

In this embodiment, the client hello message 701 is intercepted by and stored at proxy device 120. Client hello message 701 is not immediately forwarded to server 130, and server 130 is not yet aware that client device 110 is attempting to resume a secure connection with server 130. Based on the prior information included with client hello message 701, proxy device 120 determines whether previous session credentials associated with the previous encrypted handshaking procedure(s) and/or prior secure communication session(s) between client device 110, proxy device 120, and server 130 are stored at the proxy device 120. In contrast to the scenario described with reference to FIG. 5, in this embodiment, proxy device 120 determines at 702 that it has stored prior session credentials associated with previous encrypted handshaking procedure(s) and/or prior secure communication session(s) between client device 110, proxy device 120, and server 130.

Because proxy device 120 has stored prior session credentials at 702, proxy device 120 also has the requisite server authentication information (e.g., certificate) to make a policy decision regarding whether or not proxy device 120 is to remain engaged between client device 110 and server 130 or is to disengage. Next, at 703, proxy device 120 uses the stored prior session credentials at 702, including server authentication information to determine that TLS proxy services are to remain engaged during the secure communication session established between client device 110 and server 130 so that proxy device 120 intercepts or examines the communication traffic.

Proxy device 120 uses the stored prior session credentials at 702 to send a server hello message 704 to client device 110. Server hello message 704 is generated by proxy device 120 and includes key exchange information, as well as prior information associated with the previous encrypted handshaking procedure and/or prior secure communication session obtained from stored prior session credentials at 702. With this prior information sent with server hello message 704, proxy device 120 is able to re-establish a connection with client device 110. Client device 110 and proxy device 120 complete their encrypted handshaking procedure through messages 705, 706 to establish a separate secure communication session between the client device 110 and proxy device 120.

Proxy device 120 also sends a client hello message 707 to server 130. Client hello message 707 is generated by proxy device 120 based on the intercepted client hello message 701 sent from client device 110 and is configured to establish an encrypted handshaking procedure between proxy device 120 and server 130. Additionally, forwarded client hello message 707 from proxy device 120 includes key exchange information and may also include extensions or other information provided in client hello message 701 from client device 110 that is needed to establish the encrypted handshaking procedure with server 130, as well as the prior information associated with the previous encrypted handshaking procedure and/or prior communication session to allow proxy device 120 to re-establish a connection with server 130.

Upon receiving client hello message 707, server 130 sends a server hello message 708 to proxy device 120. In this embodiment, server hello message 708 also includes the corresponding key exchange information based on the key exchange information provided with client hello message 707 to encrypt the handshaking procedure between proxy device 120 and server 130. Accordingly, the remaining communications between proxy device 120 and server 130 during the handshaking procedure will be encrypted according to the shared key exchange information between proxy device 120 and server 130. Next, server 130 sends a message 709 that includes encrypted server parameters for the handshaking procedure. In this embodiment, because proxy device 120 already has stored prior session credentials at 702, additional messages from server with an encrypted authentication is not needed. Proxy device 120 completes the encrypted handshaking procedure with server 130 through messages 710, 711 to establish a secure connection with server 130.

At this point, proxy device 120 will maintain two separate, distinct TLS sessions, a first secure communication session between proxy device 120 and client device 110 and a second secure communication session between proxy device 120 and server 130, to examine all traffic between client device 110 and server 130. Accordingly, when server 130 sends application data 712, proxy device 120 receives and may inspect or examine the traffic before sending application data 713 to client device 110.

Figure 8:
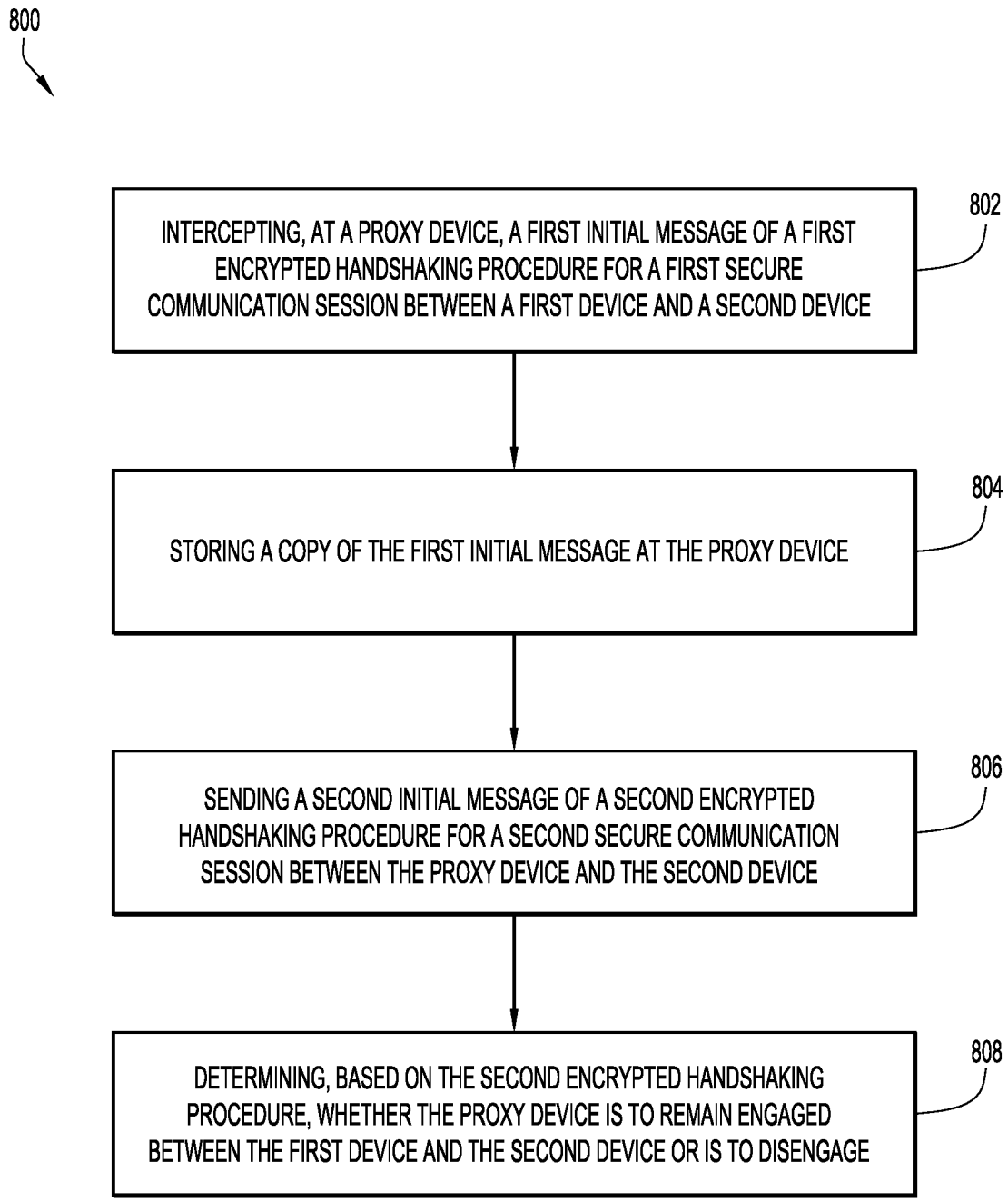
FIG. 8 is a flowchart of a method for implementing TLS proxy services with encrypted handshaking, according to an example embodiment.

With reference to FIG. 8, a flowchart is illustrated of a method 800 for providing engagement and disengagement of TLS proxy services with encrypted handshaking between two devices. At step 802, a first initial message of a first encrypted handshaking procedure for a first secure communication session between a first device and a second device is intercepted at a proxy device. The proxy device may include a first device side and a second device side, for example, the first device side may comprise a client port, while the second device side comprises a server port. With this arrangement, proxy device may be situated between the first device (e.g., a client device) and the second device (e.g., a server).

At a step 804, a copy of the first initial message intercepted at 802 may be stored at the proxy device. Additionally, information included with the first initial message may also be stored, including, for example, key exchange information and/or other extensions or information, as well as the prior information associated with a previous encrypted handshaking procedure and/or prior communication session.

At step 806, a second initial message of a second encrypted handshaking procedure for a second secure communication session between the proxy device and the second device is sent by the proxy device. For example, the proxy device may send the second initial message to the second device with key exchange information and may also include information from the first initial message, such as extensions or other information, as well as the prior information associated with a previous encrypted handshaking procedure and/or prior communication session, to allow the proxy device to establish the second encrypted handshaking procedure with the second device (e.g., the server).

At step 808, it is determined from the second encrypted handshaking procedure with the second device whether or not inspection or examination of the first secure communication session between the first device and second device by the proxy device is needed. For example, depending on the contents of the server authentication (e.g., certificate), such as the DNS server name or category, received by the proxy device during the establishment of second encrypted handshaking procedure at step 806, proxy device determines whether it is to remain engaged between the first device and the second device, or that it is to disengage so that no inspection or examination is to be made of communication traffic.

Accordingly, based on the determination of whether or not the proxy device is to remain engaged or is to disengage at step 808, the proxy device may follow the processes detailed above with regard to FIGS. 2 through 7, depending on the relevant scenario, to remain engaged or disengage between the first device and the second device.

The various scenarios for engagement and disengagement of TLS proxy services with encrypted handshaking between two devices as illustrated in FIGS. 2 through 7 may be described with reference to FIG. 9, which illustrates a flowchart of a method 900 of implementing TLS proxy services with encrypted handshaking.

Figure 9:
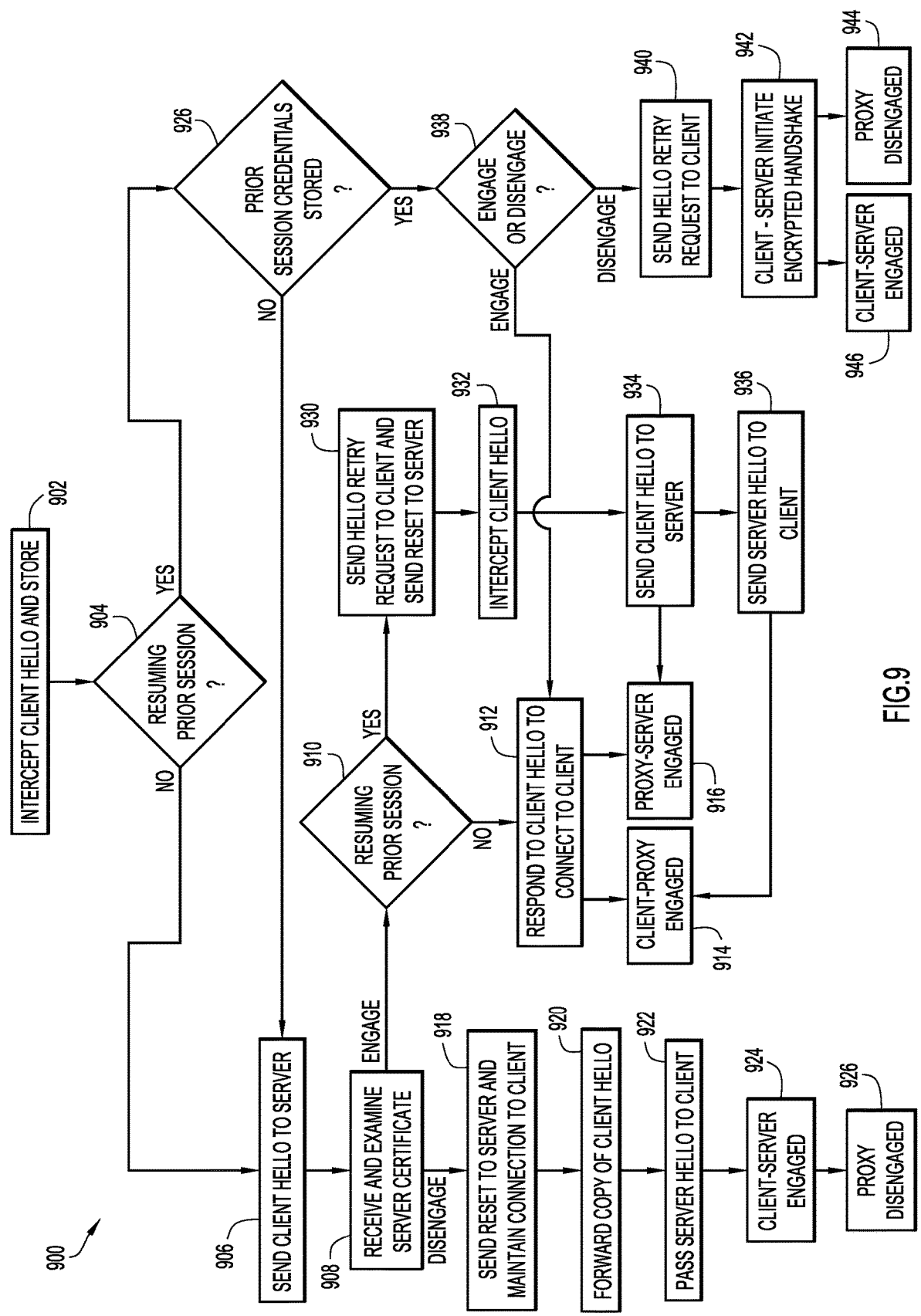
FIG. 9 is a flowchart of a method of implementing TLS proxy services with encrypted handshaking, according to the example embodiments of FIGS. 2 through 7.

Referring now to FIG. 9, method 900 may begin with an operation 902, where a proxy device (e.g., proxy device 120) intercepts and stores a copy of a client hello message from a first device (e.g., client device 110) sent to a second device (e.g., server 130) to initiate an encrypted handshaking procedure. At an operation 904, the proxy device determines whether or not the client hello message intercepted at operation 902 is attempting to resume a prior session. For example, prior information associated with a previous encrypted handshaking procedure and/or a prior secure communication session between client device 110 and server 130 may be included in the client hello message intercepted at operation 902 to initiate session resumption and/or 0-RTT features of the TLS Protocol 1.3.

Upon determining that a prior session is not being resumed, method 900 may include an operation 906 where the proxy device sends a client hello message to the server. This client hello message may be based on the stored client hello message intercepted at operation 902, but will include new keying materials for the key exchange information. At an operation 908, the proxy device receives a response from the server and examines the server's authentication information, such as a certificate. Based on the examination of the server's authentication information at operation 908, the proxy device may proceed according to a pre-established policy to determine whether to remain engaged between the client device and the server or to disengage.

Upon determining that the proxy device is to remain engaged at operation 908, the proxy device may again determine whether a prior session is being resumed at an operation 910. If no prior session is being resumed, the proxy device may respond to the client hello at an operation 912 to establish a connection to the client device. At this point, two separate secure communication sessions are established, including a first secure communication session 914 (client-proxy) and a second secure communication session 916 (proxy-server). For example, following the sequence according to FIG. 3, described above.

Referring back to operation 908, upon determining that the proxy device is to disengage, the proxy device, at an operation 918, may send a reset request to the server while maintaining the connection with the client device. At an operation 920, the proxy device forwards a copy of the client hello message intercepted and stored at operation 902 to the server. At an operation 922, the server hello message in response is passed along to the client device without further inspection or examination by the proxy device. At this point, a first secure communication session 924 (client-server) is established and the proxy device is disengaged at an operation 926. For example, following the sequence according to FIG. 2, described above.

Referring back to operation 904, upon determining that a prior session is being resumed, for example, by initiating session resumption and/or 0-RTT features of the TLS Protocol 1.3, the proxy device may determine at an operation 928 whether or not prior session credentials are stored at the proxy device. Upon determining that prior session credentials are not stored at operation 928, method 900 may proceed back to operation 906. Upon determining that the proxy device is to disengage at operation 908, method 900 continues as described above with reference to operations 918, 920, 922 so that first secure communication session 924 (client-server) is established and the proxy device is disengaged at an operation 926. For example, following the sequence according to FIG. 4, described above.

If, instead, the proxy device determines that it is to remain engaged at operation 908, method 900 proceeds to operation 910 where the proxy device determines whether a prior session is being resumed. In this example, a prior session is being resumed, so method 900 proceeds to an operation 930. At operation 930, the proxy device sends a hello retry request to the client device and sends a reset request to the server. That is, since the proxy device does not have the prior session credentials, a new session will be established between the proxy device and the client device and between the proxy device and the server.

At an operation 932, the proxy device intercepts and stores the new client hello message sent by the client device in response to the retry request from operation 930. At an operation 934, the proxy device sends a client hello message to the server to establish a second secure communication session 916 (proxy-server). The client hello message sent by proxy device at operation 934 may be based on the client hello message received at operation 932, but will include new keying materials for the key exchange information. At an operation 936, the proxy device sends a server hello message to the client device to establish a first secure communication session 914 (client-proxy). The server hello message sent by proxy device at operation 936 may be based on a server hello message received in response to the client hello message sent at operation 934, but will include new keying materials for the key exchange information. At this point, proxy device is engaged and maintaining two secure sessions 914, 916 so that it may intercept and/or examine secure communication traffic. For example, following the sequence according to FIG. 5, described above.

Referring back to operation 928, upon determining that prior session credentials are stored at operation 928, method 900 may proceed to an operation 938. At operation 938, the proxy device may use the stored prior session credentials to determine whether to remain engaged or to disengage. Upon determining that the policy requires the proxy device to remain engaged at operation 938, method 900 may continue as described with reference to operation 912 above so that two separate secure communication sessions are established, including first secure communication session 914 (client-proxy) and second secure communication session 916 (proxy-server). For example, following the sequence according to FIG. 7, described above.

Upon determining at operation 938, however, that the policy requires the proxy device to disengage, method 900 instead proceeds to an operation 940 where the proxy device sends a hello retry request to the client device. The client device may send a new client hello message that the proxy device does not intercept and allows to pass through to the server so that the client device and server may directly initiate an encrypted handshaking procedure with each other at operation 942. At this point, the proxy device is disengaged at an operation 944, while a first secure communication session 946 (client-server) is established. For example, following the sequence according to FIG. 6, described above.

Figure 10:
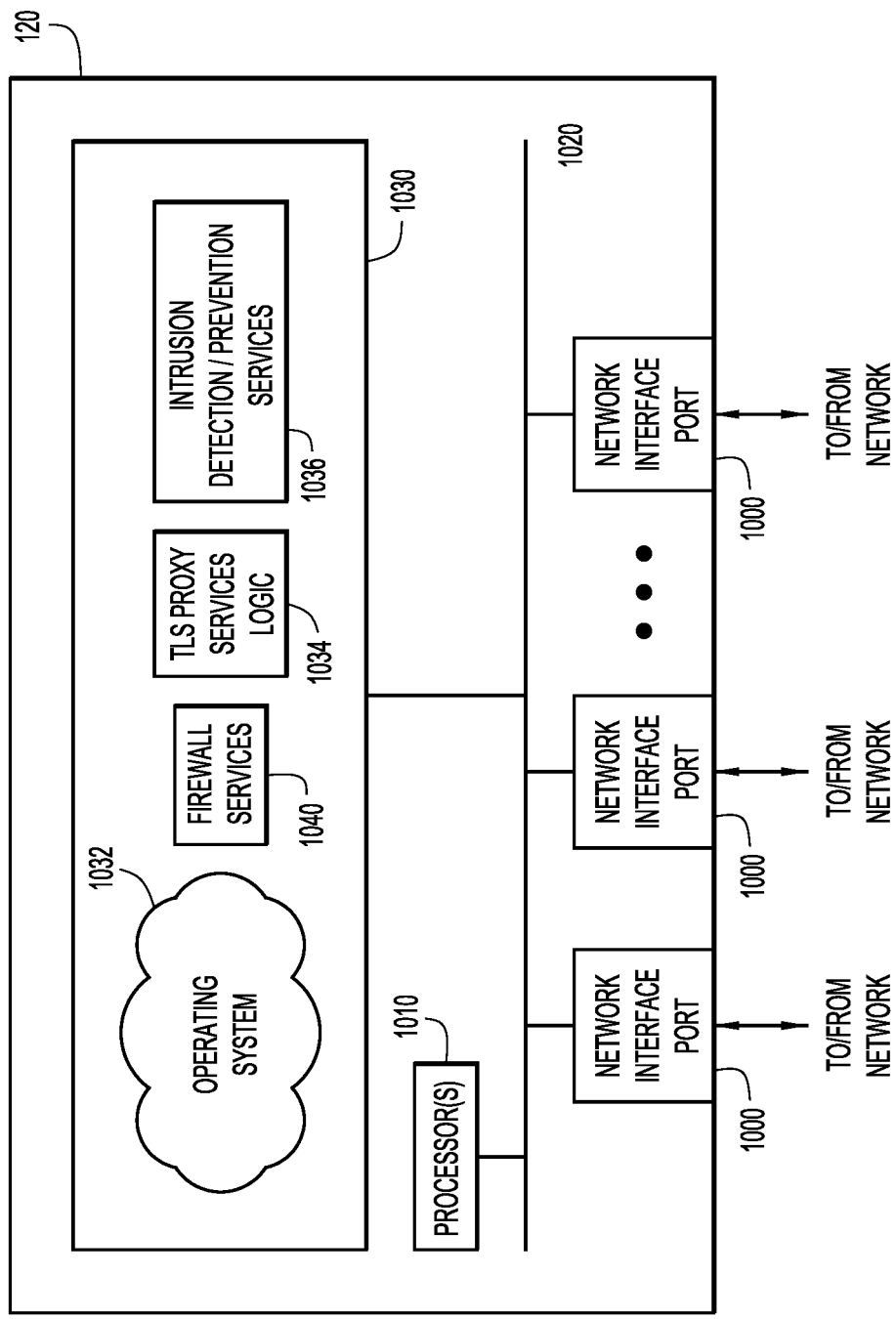
FIG. 10 is an example block diagram of a network device configured to perform engagement and disengagement of TLS proxy services with encrypted handshaking, according to an example embodiment.

With reference to FIG. 10, an example block diagram is shown of a network device, e.g., a proxy device 120, configured to perform the techniques described herein in connection with FIGS. 1-9. The proxy device 120 comprises network interface ports 1000, processor(s) 1010, bus 1020, and memory 1030. For simplicity, the network interface ports 1000 may be referred to collectively as a network interface unit. The memory 1030 comprises software instructions for operating system 1032, firewall services 1034, intrusion detection/prevention services 1036, and TLS proxy services logic 1040. The TLS proxy services logic 1040 may be included as part of the software for the firewall services 1034 and/or intrusion detection/prevention services 1036.

Memory 1030 may comprise read only memory (ROM), random access memory (RAM), magnetic disk storage media devices, optical storage media devices, flash memory devices, electrical, optical, or other physical/tangible (e.g., non-transitory) memory storage devices. The processor 1010 is, for example, a microprocessor or microcontroller that executes instructions for the proxy device logic. Thus, in general, the memory 1030 may comprise one or more tangible (non-transitory) computer readable storage media (e.g., a memory device) encoded with software comprising computer executable instructions and when the software is executed (by the processor 1010), and in particular firewall services software 1034, intrusion detection/prevention services 1036, and TLS proxy services logic 1040, it is operable to perform the operations described herein in connection with FIGS. 1-9.

In summary, techniques are presented herein for detailed TLS Protocol 1.3 encrypted handshaking procedures that allow a MITM proxy device to gracefully engage or disengage from the encrypted handshaking procedure without disrupting the user experience from the client device side of the process. That is, the TLS proxy services are transparent to the client side, which is most likely a user or device that is unable to retry a connection quickly from the client side. In both cases, a TCP or TLS level reset can be very disruptive to upper level functions.

The principles of the embodiments described herein provide a holistic proxy handshake and disengagement procedure according to the standards for TLS Protocol 1.3, including proxy handshaking requirements for session resumption and/or 0-RTT features. Additionally, the embodiments described herein also provide for engagement and disengagement of proxy services with session resumption and/or 0-RTT features.

In summary, a method of establishing a secure connection across a network is provided comprising: intercepting, at a proxy device, a first initial message of a first encrypted handshaking procedure for a first secure communication session between a first device and a second device, wherein the first initial message includes at least first key exchange information for encrypting the first encrypted handshaking procedure; storing a copy of the first initial message of the first encrypted handshaking procedure at the proxy device; sending a second initial message of a second encrypted handshaking procedure from the proxy device to the second device for a second secure communication session between the proxy device and the second device, wherein the second initial message includes at least second key exchange information for encrypting the second encrypted handshaking procedure; and determining, based on the second encrypted handshaking procedure, whether the proxy device is to remain engaged between the first device and the second device during the first secure communication session, or is to disengage such that inspection of communication traffic during the first secure communication session is not to be performed by the proxy device.

Furthermore, an apparatus is provided comprising: a network interface unit configured to enable communications over a network; a memory; and a processor coupled to the memory and the network interface unit, and configured to: intercept a first initial message of a first encrypted handshaking procedure for a first secure communication session between a first device and a second device, wherein the first initial message includes at least first key exchange information for encrypting the first encrypted handshaking procedure; store a copy of the first initial message of the first encrypted handshaking procedure; send a second initial message of a second encrypted handshaking procedure to the second device for a second secure communication session between the apparatus and the second device, wherein the second initial message includes at least second key exchange information for encrypting the second encrypted handshaking procedure; and determine, based on the second encrypted handshaking procedure, whether to remain engaged between the first device and the second device during the first secure communication session, or to disengage such that inspection of communication traffic during the first secure communication session is not to be performed.

In another form, a non-transitory computer readable storage media encoded with instructions is provided that, when executed by a processor, cause the processor to: intercept a first initial message of a first encrypted handshaking procedure for a first secure communication session between a first device and a second device, wherein the first initial message includes at least first key exchange information for encrypting the first encrypted handshaking procedure; store a copy of the first initial message of the first encrypted handshaking procedure; send a second initial message of a second encrypted handshaking procedure to the second device for a second secure communication session between the apparatus and the second device, wherein the second initial message includes at least second key exchange information for encrypting the second encrypted handshaking procedure; and determine, based on the second encrypted handshaking procedure, whether to remain engaged between the first device and the second device during the first secure communication session, or to disengage such that inspection of communication traffic during the first secure communication session is not to be performed.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of establishing a secure connection across a network, comprising:
  intercepting, at a proxy device, a first initial message of a first encrypted handshaking procedure for a first secure communication session between a first device and a second device, wherein the first initial message includes at least first key exchange information for encrypting the first encrypted handshaking procedure;
  storing a copy of the first initial message of the first encrypted handshaking procedure at the proxy device;
  sending a second initial message of a second encrypted handshaking procedure from the proxy device to the second device for a second secure communication session between the proxy device and the second device, wherein the second initial message includes second key exchange information for encrypting the second encrypted handshaking procedure;
  determining, based on the second encrypted handshaking procedure, whether the proxy device is to remain engaged between the first device and the second device during the first secure communication session, or is to disengage such that inspection of communication traffic during the first secure communication session is not to be performed by the proxy device; and
  upon determining that the first device is attempting to resume a previous secure communication session with the second device when the first initial message includes information associated with a previous encrypted handshaking procedure:
    determining whether previous session credentials are stored at the proxy device; and
    upon determining that previous session credentials are not stored and the proxy device is to remain engaged:
      establishing the first secure communication session between the first device and the proxy device;
      establishing the second secure communication session between the proxy device and the second device; and
      at the proxy device, examining communication traffic between the first device and the second device.

2. The method of claim 1, upon determining that the proxy device is to remain engaged between the first device and the second device, further comprising:
  maintaining the second secure communication session between the proxy device and the second device;
  sending a response to the first initial message of the first encrypted handshaking procedure to the first device to establish the first secure communication session between the first device and the proxy device; and
  at the proxy device, examining communication traffic between the first device and the second device.

3. The method of claim 1, upon determining that the proxy device is to disengage between the first device and the second device, further comprising:
  sending a reset request to the second device;
  forwarding the copy of the first initial message of the first encrypted handshaking procedure to the second device, wherein the copy of the first initial message includes the first key exchange information for performing the first encrypted handshaking procedure; and
  passing a response from the second device to the first device to establish the first secure communication session between the first device and the second device without examination of communication traffic by the proxy device.

4. The method of claim 3, further comprising the proxy device disengaging from the first secure communication session between the first device and the second device without resetting the first encrypted handshaking procedure at the first device.

5. The method of claim 1, wherein determining whether the proxy device is to remain engaged or is to disengage is based on a policy determination.

6. The method of claim 5, wherein the policy determination is based on examining a certificate contained in a message from the second device.

7. The method of claim 1,
wherein the first encrypted handshaking procedure and the second encrypted handshaking procedure are in accordance with a transport layer security protocol.

8. The method of claim 1, upon determining that previous sessions credentials are stored at the proxy device and upon determining that the proxy device is to remain engaged between the first device and the second device, further comprising:
responding to the first initial message from the first device using the previous session credentials stored at the proxy device to establish the first secure communication session between the first device and the proxy device, wherein the previous session credentials include information associated with a previous encrypted handshaking procedure between the first device and the proxy device; and
sending the previous session credentials stored at the proxy device in the second initial message of the second encrypted handshaking procedure from the proxy device to the second device to establish the second secure communication session between the proxy device and the second device, wherein the previous session credentials include information associated with a previous encrypted handshaking procedure between the proxy device and the second device; and
at the proxy device, examining communication traffic between the first device and the second device.

9. The method of claim 1, upon determining that previous session credentials are not stored at the proxy device and the proxy device is to remain engaged between the first device and the second device, further comprising:
sending a retry request to the first device to re-initiate the first encrypted handshaking procedure; and
sending a reset request to the second device.

10. The method of claim 1, upon determining that previous sessions credentials are stored at the proxy device and the proxy device is to disengage between the first device and the second device, further comprising:
sending a retry request to the first device to re-initiate the first encrypted handshaking procedure; and
permitting the first device to establish the first secure communication session between the first device and the second device without examination of communication traffic by the proxy device.

11. The method of claim 1, upon determining that previous session credentials are not stored at the proxy device and the proxy device is to disengage between the first device and the second device, further comprising:
sending a reset request to the second device;
forwarding the copy of the first initial message from the first device to the second device, wherein the first initial message includes information associated with the previous encrypted handshaking procedure between the first device and the second device; and
passing a response from the second device to the first device to establish the first secure communication session between the first device and the second device without examination of communication traffic by the proxy device.

12. An apparatus comprising:
a network interface unit configured to enable communications over a network;
a memory; and
a processor of a proxy device, the processor coupled to the memory and the network interface unit, and configured to:
intercept a first initial message of a first encrypted handshaking procedure for a first secure communication session between a first device and a second device, wherein the first initial message includes at least first key exchange information for encrypting the first encrypted handshaking procedure;
store a copy of the first initial message of the first encrypted handshaking procedure;
send a second initial message of a second encrypted handshaking procedure to the second device for a second secure communication session between the apparatus and the second device, wherein the second initial message includes second key exchange information for encrypting the second encrypted handshaking procedure;
determine, based on the second encrypted handshaking procedure, whether to remain engaged between the first device and the second device during the first secure communication session, or to disengage such that inspection of communication traffic during the first secure communication session is not to be performed; and
upon determining that the first device is attempting to resume a previous secure communication session with the second device when the first initial message includes information associated with a previous encrypted handshaking procedure:
determine whether previous session credentials are stored at the apparatus; and
upon determining that previous session credentials are not stored and the apparatus is to remain engaged:
establish the first secure communication session between the first device and the proxy device;
establish the second secure communication session between the proxy device and the second device; and
at the proxy device, examine communication traffic between the first device and the second device.

13. The apparatus of claim 12, upon determining to remain engaged between the first device and the second device, the processor is further configured to:
maintain the second secure communication session between the apparatus and the second device;
send a response to the first initial message of the first encrypted handshaking procedure to the first device to establish the first secure communication session between the first device and the apparatus; and
examine communication traffic between the first device and the second device.

14. The apparatus of claim 12, upon determining to disengage between the first device and the second device, the processor is further configured to:
send a reset request to the second device;

forward the copy of the first initial message of the first encrypted handshaking procedure to the second device, wherein the copy of the first initial message includes the first key exchange information for performing the first encrypted handshaking procedure; and pass a response from the second device to the first device to establish the first secure communication session between the first device and the second device without examination of communication traffic.

15. The apparatus of claim 12, wherein
the first encrypted handshaking procedure and the second encrypted handshaking procedure are in accordance with a transport layer security protocol.

16. A non-transitory computer readable tangible storage media encoded with instructions that, when executed by a processor of a proxy device, cause the processor to:
   intercept a first initial message of a first encrypted handshaking procedure for a first secure communication session between a first device and a second device, wherein the first initial message includes at least first key exchange information for encrypting the first encrypted handshaking procedure;
   store a copy of the first initial message of the first encrypted handshaking procedure;
   send a second initial message of a second encrypted handshaking procedure to the second device for a second secure communication session between the proxy device and the second device, wherein the second initial message includes second key exchange information for encrypting the second encrypted handshaking procedure;
   determine, based on the second encrypted handshaking procedure, whether to remain engaged between the first device and the second device during the first secure communication session, or to disengage such that inspection of communication traffic during the first secure communication session is not to be performed; and
   upon determining that the first device is attempting to resume a previous secure communication session with the second device when the first initial message includes information associated with a previous encrypted handshaking procedure:
      determine whether previous session credentials are stored at the proxy device; and
      upon determining that previous session credentials are not stored and the proxy device is to remain engaged:
         establish the first secure communication session between the first device and the proxy device;
         establish the second secure communication session between the proxy device and the second device; and
         at the proxy device, examine communication traffic between the first device and the second device.

17. The non-transitory computer readable tangible storage media of claim 16, upon determining to remain engaged between the first device and the second device, the instructions further cause the processor to:
   maintain the second secure communication session between the proxy device and the second device;
   send a response to the first initial message of the first encrypted handshaking procedure to the first device to establish the first secure communication session between the first device and the proxy device; and
   examine communication traffic between the first device and the second device.

18. The non-transitory computer readable tangible storage media of claim 16, upon determining to disengage between the first device and the second device, the instructions further cause the processor to:
   send a reset request to the second device;
   forward the copy of the first initial message of the first encrypted handshaking procedure to the second device, wherein the copy of the first initial message includes the first key exchange information for performing the first encrypted handshaking procedure; and
   pass a response from the second device to the first device to establish the first secure communication session between the first device and the second device without examination of communication traffic.

19. The non-transitory computer readable tangible storage media of claim 18, wherein the instructions further cause the processor to disengage from the first secure communication session between the first device and the second device without resetting the first encrypted handshaking procedure at the first device.

20. The non-transitory computer readable tangible storage media of claim 16, wherein
the first encrypted handshaking procedure and the second encrypted handshaking procedure are in accordance with a transport layer security protocol.

* * * * *